United States Patent
Kopecek

(10) Patent No.: US 11,053,889 B2
(45) Date of Patent: Jul. 6, 2021

(54) THRUST REVERSER FLOW LIMITING VALVE

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

(*) Notice: Subject to any disclaimer, the term of this patent is extended or adjusted under 35 U.S.C. 154(b) by 443 days.

(21) Appl. No.: 16/294,111

(22) Filed: Mar. 6, 2019

(65) Prior Publication Data

US 2020/0025142 A1    Jan. 23, 2020

Related U.S. Application Data

(63) Continuation of application No. 15/423,249, filed on Feb. 2, 2017, now Pat. No. 10,288,007.

(51) Int. Cl.
*F02K 1/76* (2006.01)
*F02K 1/72* (2006.01)
(Continued)

(52) U.S. Cl.
CPC ............... *F02K 1/763* (2013.01); *F02K 1/12* (2013.01); *F02K 1/58* (2013.01); *F02K 1/62* (2013.01);
(Continued)

(58) Field of Classification Search
CPC ... F02K 1/763; F02K 1/60; F02K 1/72; F05D 2270/64; F05D 2270/65
See application file for complete search history.

(56) References Cited

U.S. PATENT DOCUMENTS 3,002,497 A    10/1961    Gulick et al.
4,391,409 A    7/1983     Scholz
(Continued)

FOREIGN PATENT DOCUMENTS

CN    108884784    11/2018
EP    1398493      3/2004

OTHER PUBLICATIONS

International Preliminary Report on Patentability in International Application No. PCT/US2018/015937, dated Aug. 6, 2019, 8 pages.
(Continued)

*Primary Examiner* — Andrew H Nguyen
(74) *Attorney, Agent, or Firm* — Fish & Richardson P.C.

(57) ABSTRACT

The present subject matter can be embodied in, among other things, a two-speed thrust reverser actuation system for actuating a thrust reverser element experiencing an assisting load during movement between a stowed and deployed positions. The system includes a hydraulic actuator to move the thrust reverser element between the stowed and deployed positions, and a directional control valve with a regeneration feature including a restrictor and a velocity fuse arranged in parallel with the restrictor. The velocity fuse is configured to close when the assisting load on the thrust reverser element increases the flow rate of hydraulic fluid through the velocity fuse above threshold value. In operation, the system defines a first movement speed when the velocity fuse is open, and a second movement speed when the velocity fuse is closed, thereby decreasing an effective exit orifice size of the hydraulic actuator when the assisting load increases the deploy rate.

20 Claims, 8 Drawing Sheets

(51) Int. Cl.
*F02K 1/70* (2006.01)
*F02K 1/12* (2006.01)
*F02K 1/62* (2006.01)
*F02K 1/58* (2006.01)

(52) U.S. Cl.
CPC ............ *F02K 1/70* (2013.01); *F02K 1/72* (2013.01); *F05D 2260/60* (2013.01); *F05D 2270/331* (2013.01); *F05D 2270/56* (2013.01); *F05D 2270/64* (2013.01)

(56) References Cited

U.S. PATENT DOCUMENTS

| | | | |
|---|---|---|---|
| 5,609,020 | A | 3/1997 | Jackson et al. |
| 8,904,751 | B2 | 12/2014 | Howarth et al. |
| 9,109,536 | B2 | 8/2015 | Willett et al. |
| 9,309,835 | B2 | 4/2016 | Ko et al. |
| 10,288,007 | B2 | 5/2019 | Kopecek |
| 2004/0068977 | A1* | 4/2004 | McKay ................ F02K 1/763 60/226.2 |

OTHER PUBLICATIONS

International Search Report in International Application No. PCT/US2018/015937, dated May 15, 2018, 12 pages.
Chinese Office Action in Chinese Application No. 201880023018, dated Jan. 19, 2020, with English translation, 9 pages.

\* cited by examiner

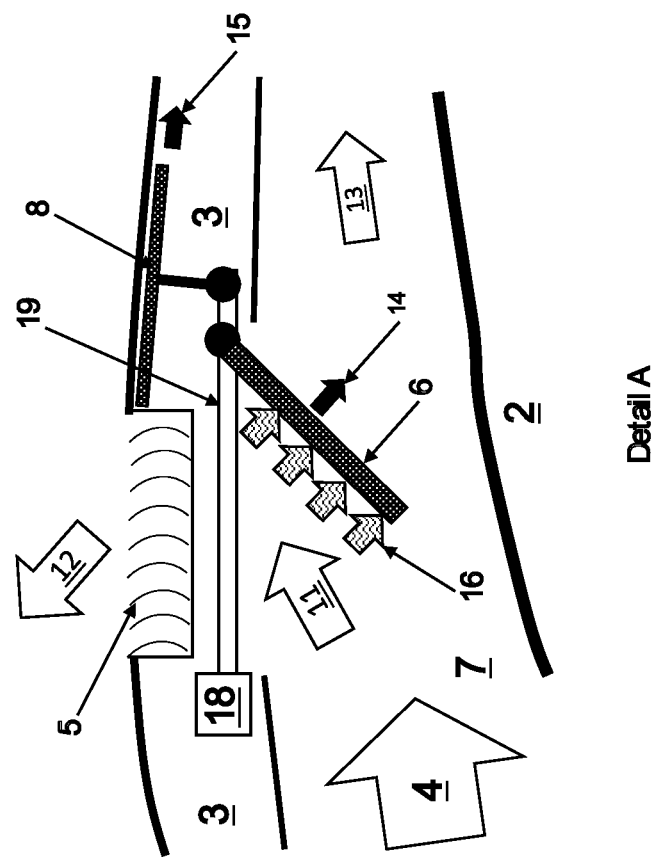
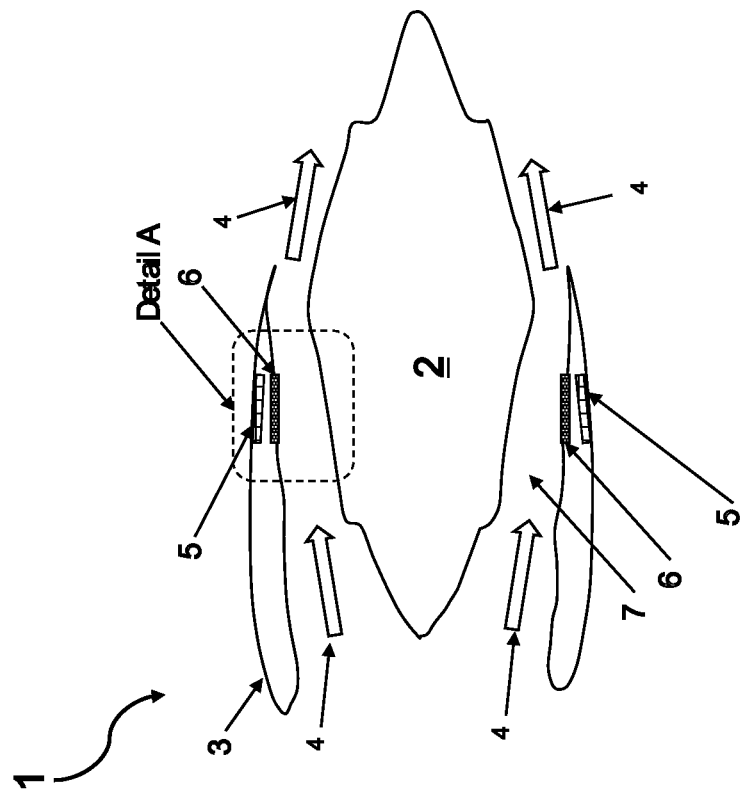
FIG. 1B
FIG. 1A

THRUST REVERSER FLOW LIMITING VALVE

CROSS-REFERENCE TO RELATED APPLICATIONS

This application is a continuation application of and claims the benefit of priority to U.S. application Ser. No. 15/423,249, filed on Feb. 2, 2017, the contents of which are hereby incorporated by reference.

TECHNICAL FIELD

This instant specification relates to hydraulic flow control mechanisms for thrust reverser actuation systems.

BACKGROUND

Thrust Reverser Actuation Systems (TRAS) power and control the deployment of aircraft thrust reversers. Thrust reversal, also called reverse thrust, involves the temporary diversion of a jet aircraft's exhaust so that it acts against the forward travel of the aircraft, providing deceleration, for example, to help slow an aircraft after touch-down. Such devices are considered important for safe operations by airlines.

However, such devices can also negatively affect the operation of an aircraft if they are misused or malfunction. A number of aircraft accidents have been traced back to accidental TRAS deployments. As such, many TRAS designs include mechanisms to control the deployment and stow speeds so that the TRAS is moved safely from one position to another during operation.

SUMMARY

In general, this document describes flow limiting valve mechanisms for thrust reverser actuation systems experiencing an assisting load during operation.

An example embodiment of the present system is a two-speed thrust reverser actuation system including a thrust reverser element configured to move between a stowed position and a deployed position during normal use in association with a jet engine, and arranged to experience an assisting load during movement of the thrust reverser element from the stowed position towards the deployed position, an isolation valve configured to supply hydraulic fluid under pressure, a hydraulic actuator configured to move the thrust reverser element between the stowed and deployed positions, the hydraulic actuator includes a directional control valve comprising a regeneration feature through which hydraulic fluid displaced from a second side of the actuator is returned to a first side of the actuator in addition to the hydraulic fluid supplied from the isolation valve during operating in the deploy mode. The regeneration feature includes a restrictor, and a velocity fuse arranged in parallel with the restrictor that is configured to close when a flow rate of hydraulic fluid through the velocity fuse in a first direction exceeds a threshold value. The hydraulic actuator includes a deploy port through which hydraulic fluid under pressure from the isolation valve is admitted to the first side of the actuator during operation of the actuator in a thrust reverser element deploy mode to displace the thrust reverser element from its stowed position to the deployed position, and a stow port through which hydraulic fluid is displaced from the second side of the actuator during operation in the deploy mode.

In some instances, the velocity fuse and restrictor of the regeneration feature define a first movement speed mode of the thrust reverser element during the deploy mode whereby the velocity fuse is open and hydraulic fluid flows through both the restrictor and the velocity fuse, and a second movement speed mode of the thrust reverser element during the deploy mode whereby the velocity fuse is closed and hydraulic fluid flows through the restrictor alone.

In some instances, the two-speed thrust reverser actuation system is configured to switch from the first movement speed mode to the second movement speed mode when the assisting load on at the thrust reverser element causes the flow rate of hydraulic fluid through the velocity fuse to exceed the threshold value and close the velocity fuse.

In some instances, the assisting load on the thrust reverser element acts to increase a deploy rate of the thrust reverser element and increase the flow rate of hydraulic fluid through the velocity fuse when the two-speed thrust reverser actuation system is in the first movement speed mode.

In some instances, the assisting load on the thrust reverser element increases during movement of the thrust reverser element from the stowed position towards the deployed position.

In some instances, the hydraulic actuator comprises a double-acting hydraulic piston and cylinder device.

In some instances, the threshold value of the velocity fuse corresponds to a maximum deploy rate of the thrust reverser element.

In some instances, the restrictor defines a first orifice and the velocity fuse defines a second orifice, and the first orifice and the second orifice define an overall orifice of the regeneration feature.

In some instances, the velocity fuse is configured to open when the flow rate of hydraulic fluid through the regeneration feature is below a minimum value.

In some instances, the velocity fuse is configured to open when the flow rate of hydraulic fluid through the regeneration feature is zero.

In some instances, the hydraulic actuator is configured to move the thrust reverser element from the deployed position to the stowed position in a thrust reverser element stow mode where hydraulic fluid under pressure from the isolation valve is admitted through the stow port to the second side of the actuator, where the stow side of the actuator is the high pressure side during operation of the actuator in the thrust reverser element stow mode to displace the thrust reverser element from its deployed position to the stowed position, and hydraulic fluid is displaced from the first side of the actuator through the deploy port during operation in the deploy mode.

In some instances, the hydraulic fluid flow through the regeneration feature is reversed to switch the hydraulic actuator from the thrust reverser element deploy mode to the thrust reverser element stow mode, the hydraulic fluid flowing through the velocity fuse in an opposite direction during the thrust reverser element stow mode.

In some instances, the velocity fuse is configured to open when the hydraulic fluid flows through the velocity fuse in the opposite direction In some instances, the thrust reverser element includes a translating cowl mounted to a nacelle of a gas turbine engine and adapted to translate a distance in an aft direction of the gas turbine engine, the translating cowl having a radially inner wall that defines a radially outer flow surface of a bypass duct defined by and between the nacelle and a core of the gas turbine engine, a fixed structure within the nacelle that does not translate with the translating cowl, the fixed structure comprising at least one opening that is exposed to the bypass duct when the translating cowl is translated in the aft direction, and blocker doors mounted to the nacelle and having stowed positions and deployed positions, at least a portion of the blocker doors being disposed in the bypass duct in the deployed position, and where the blocker doors are arranged to experience the assisting load from an airflow in the bypass duct.

In some instances, the hydraulic actuator is configured to deploy the blocker doors in a first direction and stow the blocker doors in an opposite direction.

In some instances, the directional control valve is configured to supply the hydraulic fluid to the hydraulic actuator via a supply line and receive the hydraulic fluid from the hydraulic actuator via a stow line, wherein the direction control valve enables regeneration of hydraulic fluid from the stow line to the supply line during the deploy mode.

In some instances, the isolation valve is configured to supply the hydraulic fluid to the directional control valve from a source of hydraulic fluid under pressure.

In some instances, the velocity fuse and restrictor are incorporated together into a single cartridge assembly.

In some instances, the hydraulic actuator comprises the velocity fuse and the restrictor.

Another example embodiment is a method of operating a thrust reverser element. The method includes flowing hydraulic fluid to a deploy port of a hydraulic actuator to move the thrust reverser element from a stowed positioned to a deployed position, receiving a flow of hydraulic fluid from a stow port of the hydraulic actuator through a restrictor and velocity fuse, the thrust reverser element receiving an assisting load between the stowed position and the deployed position, the assisting load accelerating the movement of the thrust reverser element and increasing the flow of hydraulic fluid from the hydraulic actuator through the velocity fuse, automatically closing the velocity fuse when the flow of hydraulic fluid from the hydraulic actuator through velocity fuse exceeds a threshold value, the flow of hydraulic fluid from the hydraulic actuator passing through the restrictor alone, and automatically opening the velocity fuse when the thrust reverser element reaches the deployed position and the flow of hydraulic fluid from the stow port of the hydraulic actuator is below a minimum value.

In some instances, with the thrust reverser element in the deployed position, the method includes flowing hydraulic fluid through the restrictor and velocity fuse to the stow port of a hydraulic actuator to move the thrust reverser element from the deployed positioned to the stowed position, and receiving a flow of hydraulic fluid from the deploy port of the hydraulic actuator.

The systems and techniques described here may provide one or more of the following advantages. First, a system can provide a thrust reverser actuation system with a first speed and a second speed triggered by an assisting force on an element of the thrust reverser. Second, a system can reduce hydraulic fluid demand from an aircraft's hydraulic system. Third, a system can prevent cavitation and the associated damage that cavitation can cause.

The details of one or more implementations are set forth in the accompanying drawings and the description below. Other features and advantages will be apparent from the description and drawings, and from the claims.

DESCRIPTION OF DRAWINGS

FIGS. 1A and 1B are schematic diagrams that show an example of an engine system including a hidden blocker door thrust reverser system and a thrust reverser actuation system (TRAS).

DETAILED DESCRIPTION

Figure 2:
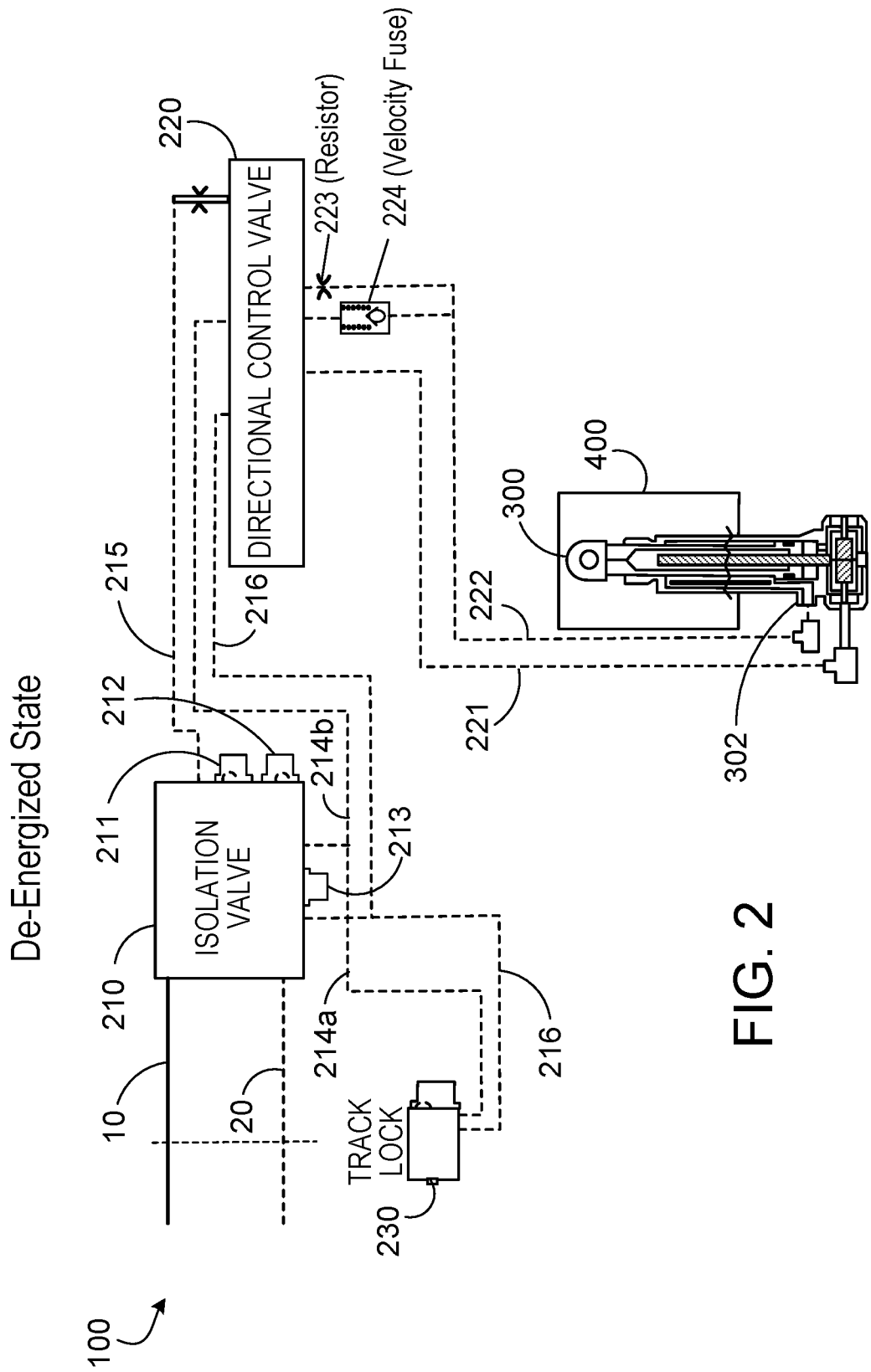
FIG. 2 is a schematic diagram that shows an example of a two-speed TRAS.

This document describes systems and techniques for locking a thrust reverser actuation system (TRAS). Many TRAS systems include locking mechanisms to keep jet engine reverser cowl sections from deploying accidentally. Some existing TRAS locking mechanisms systems utilize large bias springs to bias locks toward the locked position and to overcome vibration and air load forces, and use hydraulic linear actuators with high power densities to overcome the bias springs in order to release the locks. Such systems add weight and consume space, both of which can be limited, especially in aircraft applications.

Modern thrust reverser systems, such as the Hidden Blocker Door type TRAS disclosed in U.S. Pat. No. 8,904,751, experience high aiding loads towards the end of the deploy stroke of the actuating arm of the system and therefor have two very different speed regimes during deployment. Hidden blocker door type thrust reversers increases engine efficiency, but require changes to the TRAS to account for the high aiding loads. Specifically, when the hidden blocker door starts to deploy, the door is increasing exposed to the bypass airflow of the engine mid-stroke and thus the tension load on the TRAS greatly increases when the hidden blocker door starts to deploy. The high aiding loads increase the deploy speed of the thrust reverser and the TRAS needs to be able to control the deploy speed of the thrust reverser during the entire deploy motion. One solution is to have a TRAS with multiple deploy speeds, where the TRAS has a deploy speed specifically for when the thrust reverser experiences high aiding loads. Conventional TRAS systems would either introduce another solenoid valve (and associated control circuitry) for the second speed and/or a flow rate regulator. However, this would introduce a large amount of weight, cost and complexity into the system.

Conventional thrust reverser actuation systems often have fixed orifices to control the velocity of the thrust reverser during deployment, where the velocity of the thrust reverser is dependent upon the hydraulic pressure applied, the load applied to the actuators, and the sizing of the orifices. However, new reverser designs, such as the hidden blocker door design, place loads that have large changes in magnitude depending upon the position of the thrust reverser during the deploy operation. A conventional thrust reverser actuation system design would cause rapid changes in velocity because the loads have large changes, whereas the orifices that control the velocity of the reverser do not change. The conventional approach to rectify this situation would be to create a two-speed thrust reverser actuation system by installing an additional solenoid valve piloting a spool and sleeve (or other) type valve to change the velocity of the thrust reverser when the stroke reaches a certain position. However, this would necessitate the installation of sensors to initiate the switching process, relays, electrical cabling, valves and other components that would greatly increase the complexity, cost and weight of the thrust reverser actuation system.

This disclosure describes a two-speed reverser with far less cost and weight than conventional technology would require. Some examples of the present disclosure limit the velocity of a TRAS by installing a velocity fuse and an orifice (or flow regulator) in hydraulic parallel in the actuator retract line of the TRAS. The outflow from the actuator retract port during deployment of the actuators is controlled by this arrangement in order to provide two distinct speed regimes for the actuator during deployment. This is especially useful for controlling the velocity of a transcowl when high aiding loads are present near the end of the actuator deploy stroke.

Some embodiments of the present disclosure provide a simple fluid velocity based solution by using a velocity fuse to create a two-speed thrust reverser actuation system that precludes the need for any additional sensors, valves, circuits and wiring. Examples includes a velocity fuse and an orifice (e.g., a restrictor or flow regulator) arranged in parallel in the hydraulic actuator retract line (i.e., stow line) line of a TRAS. The orifice is placed in parallel with the velocity fuse to regulate the second speed of the actuator during the deploy cycle. A flow regulator may be substituted for the orifice to have further hydraulic control during and/or after the velocity fuse is closed.

In operation, regenerative flow during a thrust reverser deploy cycle flows from an actuator retract port in parallel with a restrictor and a velocity fuse to the retract port of a direction control valve (DCV). The velocity fuse is similar to a standard check valve except that the spring is located on the opposite side of the poppet. The spring force holds the poppet open instead of forcing it closed as in a standard check valve. Hydraulic fluid flow across the velocity fuse creates a differential pressure across the poppet and thus a force on the poppet opposing the spring. When the flow reaches a pre-determined value, the force on the poppet overcomes the spring force and the poppet closes.

During a first deploy speed, the velocity fuse is open and the flow resistance is less through the velocity fuse than the orifice so the hydraulic fluid flow from a retract port of a hydraulic actuator (i.e., the velocity of the TRAS actuators) is not regulated by the orifice.

During the second speed, the high flow (caused by high aiding load conditions on the transcowl or blocker door) causes the velocity fuse to close and the velocity of the TRAS actuators is now entirely controlled by the flow orifice (or flow regulator) in parallel with the velocity fuse. This limits the velocity of the TRAS and thus the transcowl and blocker door. In some instances, the restrictor is tuned to permit a maximum TRAS deploy velocity, such as during Refused Takeoff (RTO).

By limiting the velocity of the transcowl, the transcowl and thrust reverser structure does not have to be designed for high impact loads that would otherwise be created by high aiding loads on the transcowl. In some instances, a flow regulator is used instead of a simple restrictor if regulated constant flow is needed at the second speed. However, a flow regulator is more costly than a simple restrictor orifice.

This invention could also be used to provide two speeds for the actuator retract cycle (TRAS stow) as well as for deploy cycle of the TRAS as described above. FIGS. 1A and 1B are schematic diagrams that show an example of an engine system including a hidden blocker door thrust reverser system and a thrust reverser actuation system (TRAS). FIG. 1A illustrates a cross-section of a high-bypass turbofan engine 1 including a core engine 2 and a fan housing 3. The fan housing 3 includes a thrust reverser assembling including a hidden blocker door 6 and a thrust reverser cascade 6. In operation, a fan assembly located in front of the core engine 2 includes ingests air 4 into the fan housing 3, and a large portion of the air 4 that enters the fan housing 3 is bypassed to the rear of the engine 1 to generate additional thrust. The bypassed air 4 passes through an annular bypass duct 7 between the fan housing 3 and the core engine 2. A thrust reverser assembly is show in the fan housing 3 in a stowed position, in which the bypass air 4 is not being directed across the thrust reverser cascade 6, the hidden blocker door 6 is not positioned in the bypass airflow 4, and a transcowl (shown in FIG. 1B) is positioned over the thrust reverser cascade 6.

FIG. 1B is a cross-sectional illustration of Detail A of FIG. 1A with the hidden blocker door 6 in a partially deployed position in the bypass duct 7. FIG. 1B shows the hidden blocker door 6 operatively coupled to a thrust reverser actuation system (TRAS) 18, which includes a deploy arm 19 connected to the hidden blocker door 6 and a transcowl 8. In operation, the TRAS 18 includes hydraulic actuators that translate the deploy arm 19 and move the hidden blocker door 6 into the bypass duct 7 (indicated by arrow 14) and slide the transcowl 8 in an aft direction (indicated by arrow 15) to expose the thrust reverser cascade 6 to the bypass duct 7. With the transcowl 8 translated away from the thrust reverser cascade 6, airflow 11 is deflected by the intrusion of the hidden blocker door 6 into the bypass airflow 4 in the bypass duct, and the thrust reverser cascade 6 reversers a portion of the momentum of the deflected airflow 11 as a thrust reversed airflow 12 that exits the fan housing 3 through the thrust reverser cascade 6. As the hidden blocker door 6 deploys (indicated by arrow 14) into the bypass duct 7, a portion 13 of the bypass air 4 that passes the hidden blocker door 6 decreases, and the increased deflection of the deflected air 11 causes an increase in a force (indicated by arrows 16) applied to the hidden blocker door 6. During the deploy motion of the TRAS 18, the force 16 will serve to accelerate the deploy rate of the hidden blocker door 6 into the bypass duct 7. In some instances, the force 16 transitions the deploy arm 16 (and actuators) of the TRAS 18 from applying a deploy force once to the hidden blocker door 6 to applying a resisting force (opposite the deploy force) in order to slow the deploy speed of the hidden blocker door 6 as it is being forced open by the deflection 11 of the bypass air 4 into the thrust reverser cascade 5. The deploy operation is complete when the hidden blocker door 6 is fully deployed into the bypass duct 7.

FIG. 2 is a schematic diagram that shows an example of a two-speed thrust reverser actuation system (TRAS) 100 which may be used to actuate the thrust reverser elements (e.g., the hidden blocker door 6 and transcowl 8) of FIGS. 1A and 1B. The TRAS 100 includes an isolation valve 210 connected to the hydraulic system of an aircraft engine, which includes a supply of high pressure hydraulic fluid 10 and a hydraulic fluid return 20. The isolation valve 210 is connected by hydraulic fluid lines (described in more detail below) to a direction control valve (DCV) 220 and a track lock mechanism 230. The track lock mechanic 230 is configured to engage and release a locking mechanism on a movement track of a thrust reverser system of the aircraft engine. The DCV 220 is configured to operate a hydraulic actuator 300 which is configured to move a thrust reverser element 400 of the thrust reverser system of the aircraft engine. The track lock 230 is an example of a tertiary lock that can be used on the TRAS 100 to provide a third level of protection against inadvertent in-flight deployment of the thrust reverser element 400. In some instances, alternative tertiary locks such as Sync Locks (as shown, for example, in U.S. Pat. No. 5,609,020) or hook locks (as shown, for example, in U.S. Pat. No. 9,109,536) are be used instead of the track lock 230.

The isolation valve 210 includes a solenoid valve 213 to control a flow of high pressure hydraulic fluid to the track lock 230 along a track lock supply line 214a and to the DCV 220 along a stow supply line 214b. The isolation valve 210 also includes two solenoid valves 211, 212 configured to control a flow of high pressure hydraulic fluid to the DCV valve via a deploy supply line 215. A hydraulic fluid return line 216 carries low pressure hydraulic fluid return from the DCV 220 and the track lock 230. The hydraulic actuator 300 includes a deploy port 301 and a stow port 302. In some instances, the hydraulic actuator is a double-acting hydraulic piston and cylinder device having first and second sides of the piston, where hydraulic fluid under pressure from the isolation valve 210 is admitted to the first side of the actuator through the deploy port 301 during operation of the actuator in a thrust reverser element deploy mode to displace the thrust reverser element 400 from a stowed position to the deployed position, and hydraulic fluid is displaced from a second side of the actuator through the stow port 302 during operation in the deploy mode. The DCV 220 is connected to the hydraulic actuator 300 with a deploy line 221 and a stow line 222. The deploy line 221 is coupled to the deploy port 301 of the hydraulic actuator 300, and the stow line 222 is coupled to the stow port 302 of the hydraulic actuator 300. The stow line 222 includes a resistor 223 and a velocity fuse 224 arranged in parallel.

In a deploy operation, and as described in more detail in connection with FIGS. 3-6, a first TRAS deploy speed occurs when high pressure hydraulic fluid is supplied to the DCV 220 via the deploy supply line 215 and the stow supply line 214b, the DCV 220 provides a flow of hydraulic fluid to the deploy port 301 of the hydraulic actuator 300. The high pressure of the hydraulic fluid at the deploy port 301 moves the thrust reverser element 400 and the movement of the thrust reverser element 400 drives a flow of hydraulic fluid from the stow port 302, through the stow line 222, and through the restrictor and velocity fuse 224. The DCV receives the flow of hydraulic fluid from the stow line 222 and enables regeneration of the flow back to the deploy line 221. At some point during the deploy operation, the thrust reverser element 400 receives an assisting load that increases the deploy rate of the thrust reverser element 400, which increases the flow rate of the hydraulic fluid from the stow port 302 of the hydraulic actuator 300 and therefore through the velocity fuse 224. When the flow rate through the velocity fuse 224 increases beyond a maximum amount, the velocity fuse 224 closes, and the hydraulic fluid flow from the stow port 302 now travels to the DCV 220 through the resistor 223 alone. The closed velocity fuse 224 reduces the effective orifice size of the stow line 222 and represents the second deploy speed mode of the TRAS 100. The following FIGS. 3-7 show a deploy operation, and a stow operation, in more detail.

Figure 3:
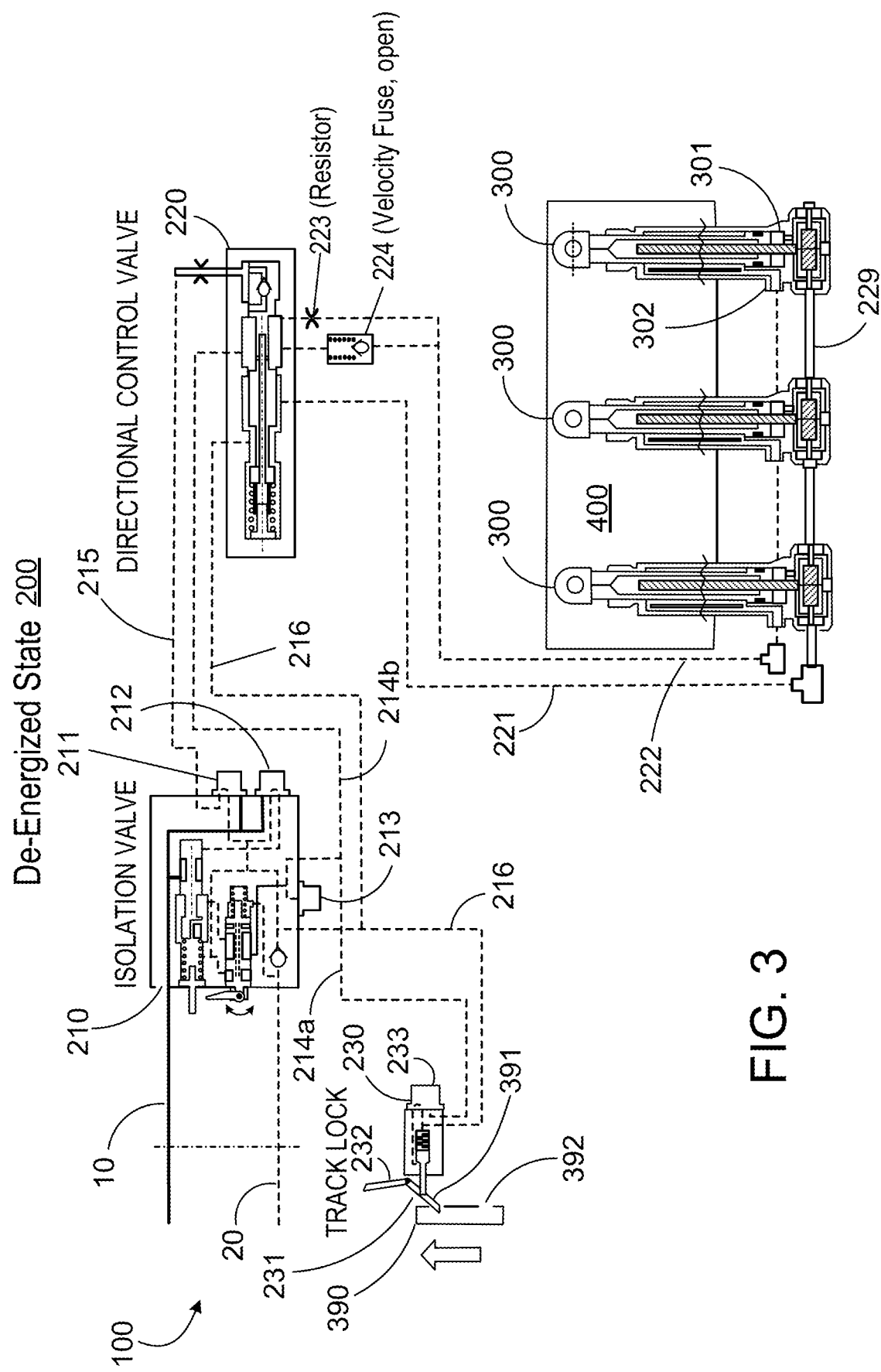
FIG. 3 is a schematic diagram that shows another example of a two-speed TRAS in a de-energized state.

FIG. 3 is a schematic diagram that shows another example of a two-speed TRAS 100 in a de-energized state 200. FIG. 3 illustrates the basic configuration in the stow condition 200. Hydraulic lines illustrated with solid lines represent high pressure hydraulic fluid is being supplied, and hydraulic fluid lines drawn with dotted lines represent no connection to the hydraulic return. FIG. 3 shows the TRAS system 100 of FIG. 2 with additional details illustrated. In FIG. 3 the internal hydraulic lines of the isolation valve 210, DCV 220, and track lock 230 are shown for completeness. In FIG. 3, three hydraulic actuators 300 are arranged to move the thrust reverser element 400 and the movement of the three hydraulic actuators 300 is synchronized by a mechanical synch shaft 229. FIG. 3 shows that the track lock 230 includes a solenoid valve 233 to control the supply of hydraulic fluid from the track lock supply line 214a. The track lock 230 actuates a lock pawl having a stowed end 231 and a deployed end 232 configured to engage a stowed lock slot 391 and a deployed lock slot 392 of a slider 390 of the thrust reverser system. In FIG. 3, the solenoid valves 211, 212 of the isolation valve 210 are de-energized and the high pressure hydraulic supply 10 from the engine is disconnected from the TRAS 100. In the de-energized state 200 shown in FIG. 3, a poppet in the velocity fuse 224 is held open by its internal spring.

Figure 4:
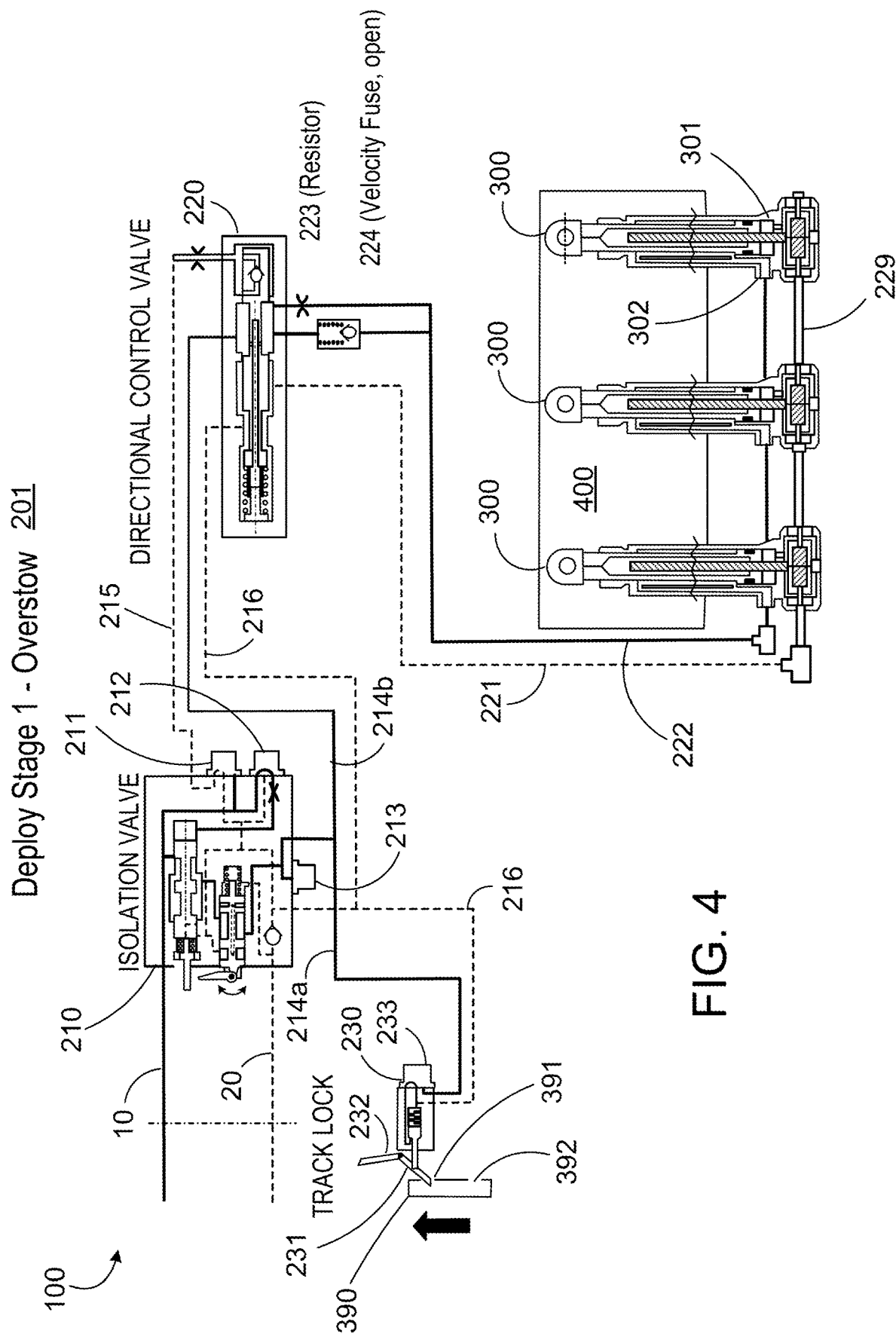
FIG. 4 is a schematic diagram that shows the example two-speed TRAS system of FIG. 3 in a overstow state.

FIG. 4 is a schematic diagram that shows the two-speed TRAS 100 system of FIG. 3 in an overstow state 201. FIG. 4 illustrates the basic configuration in the overstow condition. In FIG. 4, the solenoid valve 213 of the isolation valve 210 is coupled to the track lock supply line 214a and a stow supply line 214b is energized, as well as one solenoid valve 212 of the two coupled to the deploy supply line 215. With the track lock supply line 214a and a stow supply line 214b pressurized, hydraulic fluid flow from the isolation valve 210 is ported, by the DCV 220, to the stow line 222 and, therefore, to the stow ports 302 of the hydraulic actuators 300. Hydraulic fluid pressure at the stow ports 302 retracts chambers of the actuators 300 in order to unload the locking elements within the actuators 300.

Figure 5:
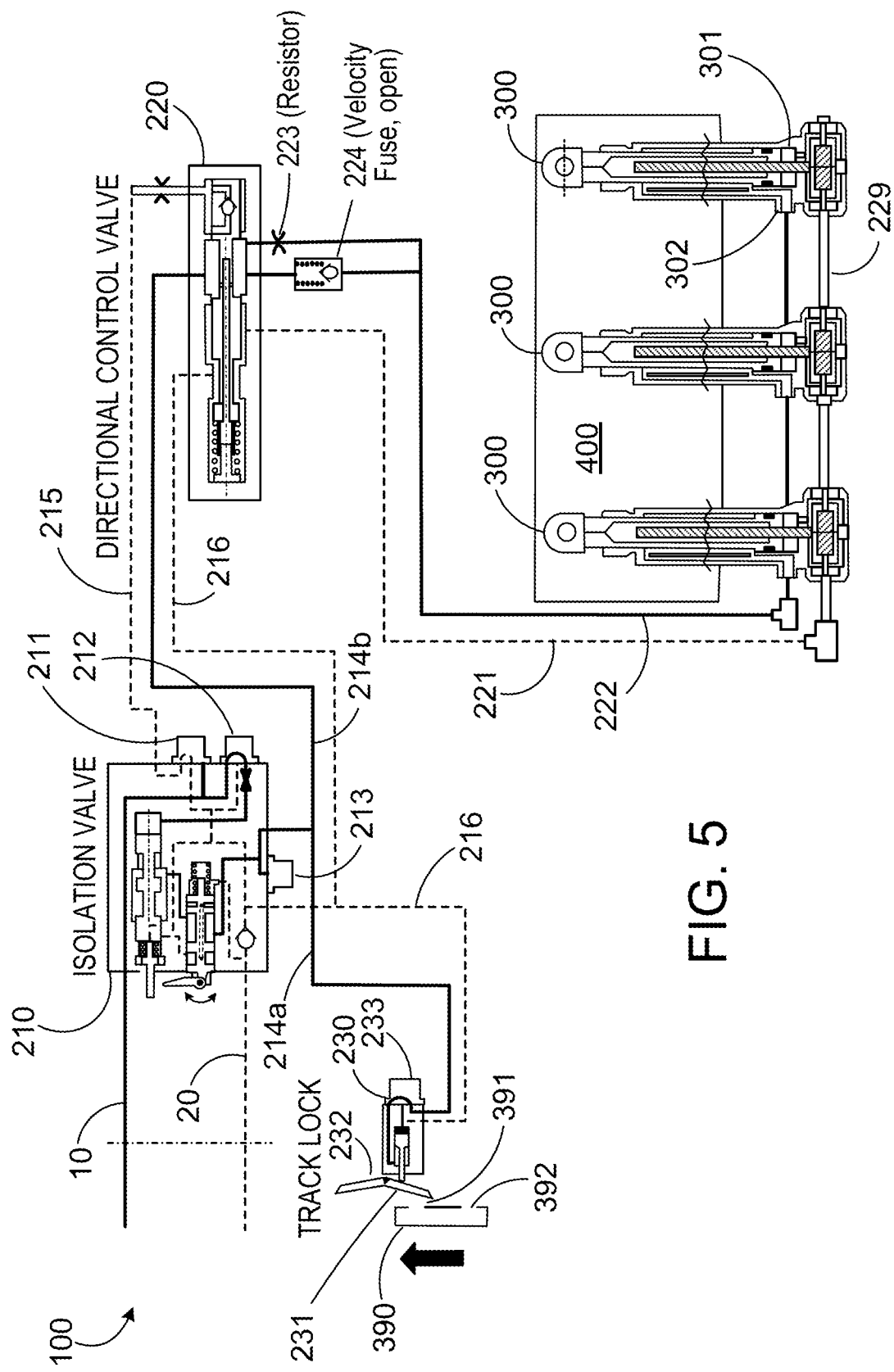
FIG. 5 is a schematic diagram that shows the example two-speed TRAS system of FIG. 3 unlocking a track lock.

FIG. 5 is a schematic diagram that shows the two-speed TRAS system of FIG. 3 unlocking the track lock 230. FIG. 5 illustrates the tertiary lock (i.e., track lock 230) unlocking while overstow is being maintained. The track lock solenoid valve 233 is energized and the high pressure hydraulic fluid in the track lock 230 disengages the stowed lock pawl 231 from the stowed lock slot 391 of the slider 390.

Figure 6:
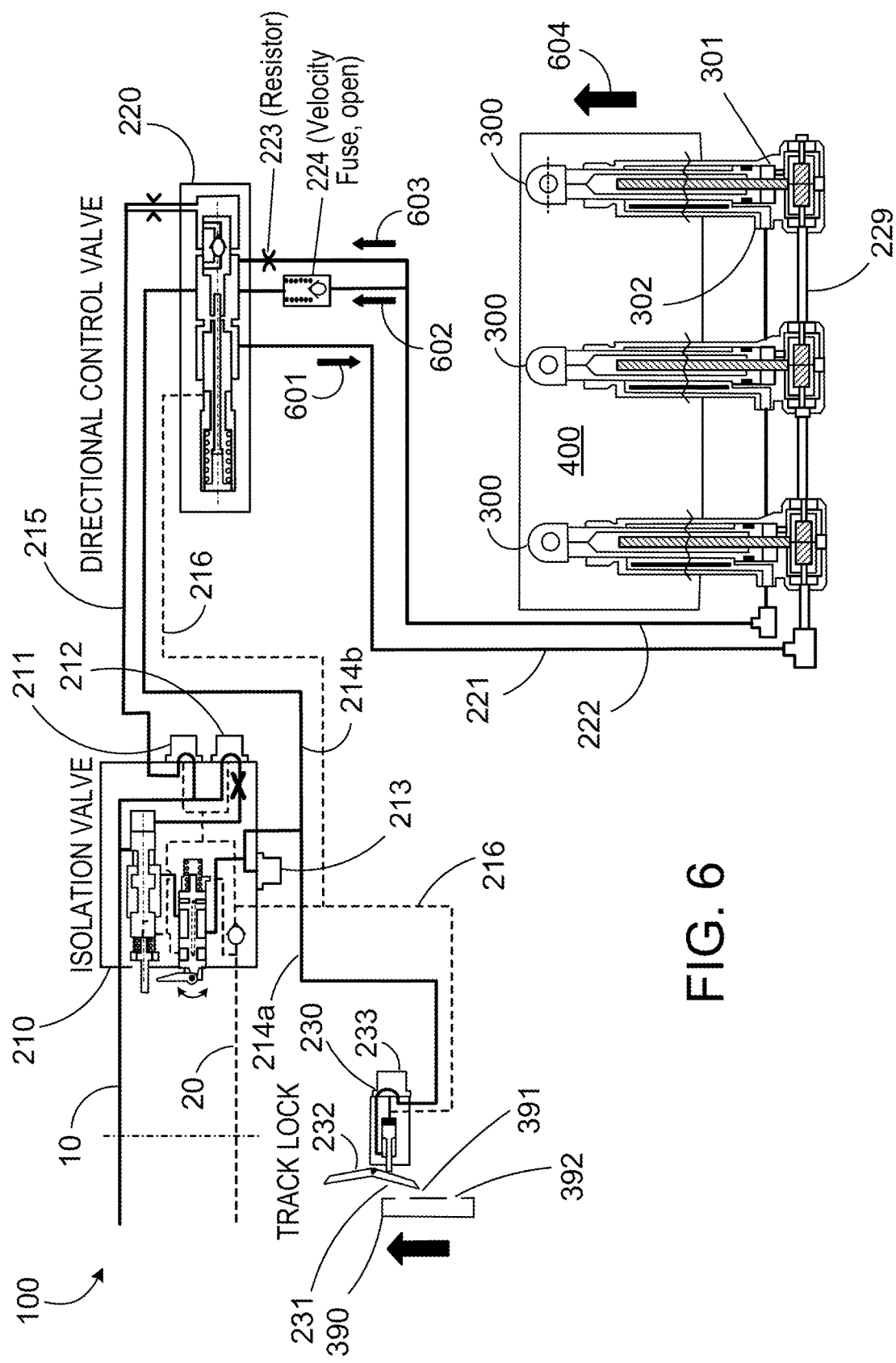
FIG. 6 is a schematic diagram that shows the example two-speed TRAS system of FIG. 3 in a first deploy speed state.

FIG. 6 is a schematic diagram that shows the two-speed TRAS system of FIG. 3 in a first deploy speed state 202. Both solenoid valves 211, 212 of the deploy supply line 215 of the isolation valve 210 are energized and hydraulic pressure flows to the DCV 220 where it is ported to the deploy port 301 (head end) of the actuator 300 via the deploy line 221. Hydraulic pressure is also ported to the stow ports 302 of the actuators 300 using the regenerative feature of the DCV 220. Specifically, regenerative flow is enabled from the actuator stow port 302 (i.e., the retract port, or the rod end of the piston) in parallel through the resistor 223 (or flow regulator) and the 224 velocity fuse to the stow port of the DCV. Regenerative flow is the flow that is recirculated from the actuator stow ports 302 to the deploy ports 301 during the deploy cycle (actuators 300 are extending). The flow from stow ports 302 is added to the system pressure from the isolation valve 214b in the DCV 220. The sum of these two fluid flows is then ported to the deploy ports 301 during actuator 300 deployment of the thrust reverser element 400. This regenerative technique reduces fluid flow demand from the aircraft hydraulic system, otherwise isolation valve flow 214b would have to supply all of the fluid to deploy the actuators. In operation, hydraulic fluid flows, as indicated by arrow 601, into the deploy ports 301 of the hydraulic actuators 300 and the thrust reverser element 400 is moved in the deploy direction, as indicated by arrow 604. Because the hydraulic actuators 300 are extending, hydraulic fluid flows out of the stow port 302 and through the velocity fuse 224, indicated by arrow 603, and through the resistor 223, indicated by arrow 602.

In general, so long as a certain flow rate from the actuators 300 is not exceeded, the velocity fuse 224 remains open due to the spring force keeping the velocity fuse 244 open.

Figure 7:
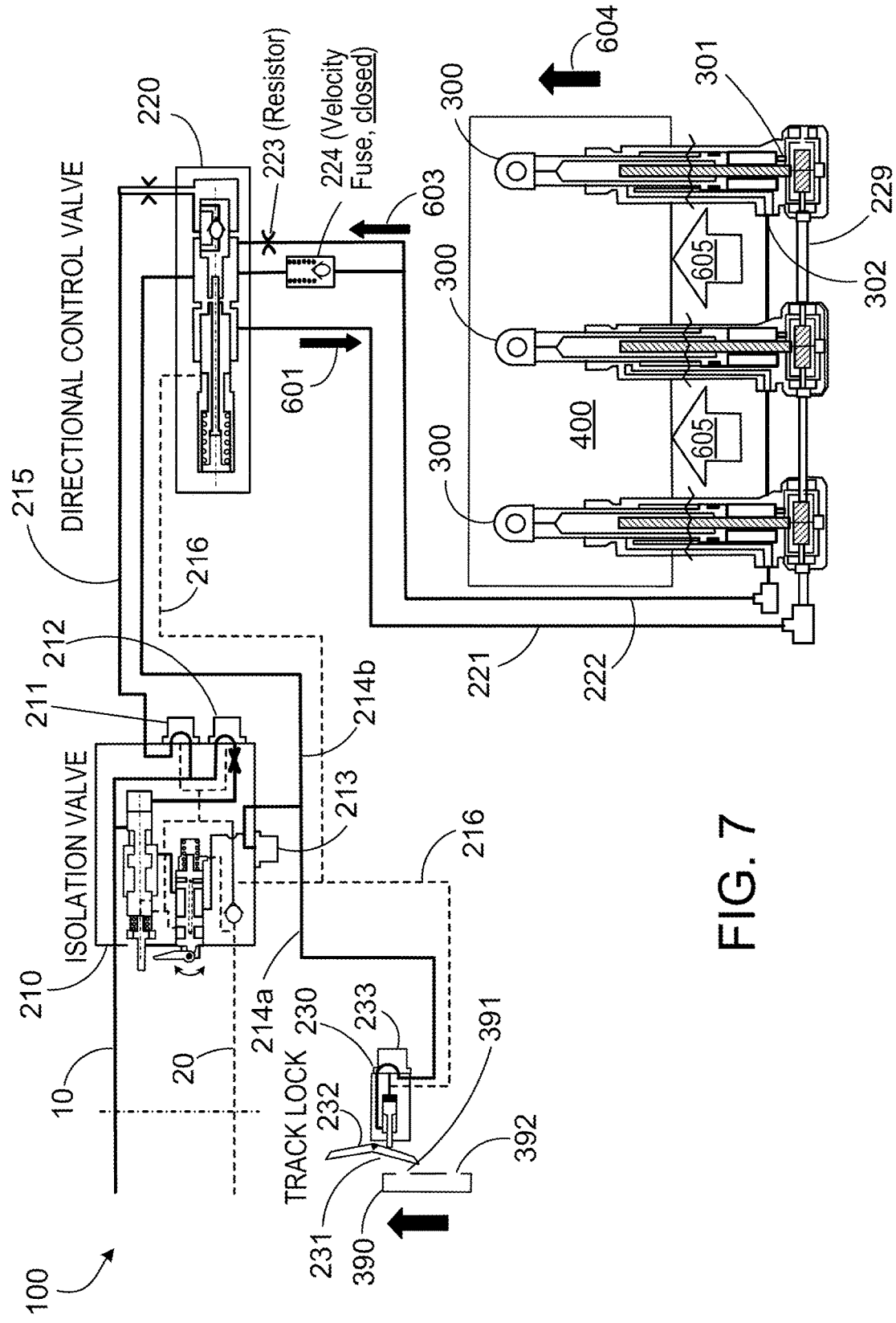
FIG. 7 is a schematic diagram that shows the example two-speed TRAS system of FIG. 3 in a second deploy speed state.

FIG. 7 is a schematic diagram that shows the two-speed TRAS system of FIG. 3 in a second deploy speed state 204. The DCV 220 is energized and hydraulic pressure is ported to the deploy ports 301 (head end) of the actuators. Hydraulic pressure is also ported to the stow ports 302 of the actuators 300 (regenerative type DCV 220). Immediately prior to the second deploy speed condition 204 of FIG. 7, regenerative flow from the actuator retract port (rod end) flows in parallel through the resistor 223 (or regulator) and the velocity fuse 224 to the stow port of the DCV. However, in FIG. 7 an assisting force 605 is being applied to the thrust reverser element 400 and the assisting force increases the movement of the thrust reverser element in the deploy direction, indicated by arrow 604. The increased movement rate of the thrust reverser element 400 causes the flow rate through the velocity fuse 224 to be exceeded and the velocity fuse 224 closes. The velocity fuse 224 remains closed because the force created by the differential pressure from the hydraulic fluid flow across the velocity fuse 224 poppet overcomes the spring force keeping the velocity fuse 244 open. In this instance, the only fluid path left through the stow line 222 is through the resistor 223 (or regulator), thus limiting the maximum velocity of the thrust reverser element 400 during deployment by decreasing the effective orifice size of the stow line 222, compared to when the velocity fuse 224 was open.

The velocity fuse 224 re-opens when thrust reverser element 400 reaches the end of deploy stroke, because fluid flow ceases and therefore removes the fluid force on velocity fuse poppet. The bias spring re-opens poppet velocity fuse 224 so that stow action of TRAS 100 is unaffected and reverse-flow of fluid through the velocity fuse 224 is allowed.

Additionally, aspects of the present system prevent possibility of cavitation in the hydraulic fluid lines when the assisting force 605 is driving the movement of the thrust reverser element 400. For example, if the actuators 400 were permitted to extend faster (due to high aiding load 605) than isolation valve 210 supply line 214b can supply make-up flow (make-up flow being determined by the actuator 300 bore area and the actuator 300 velocity, minus any regeneration flow) then cavitation occurs. Additionally, the pressure in the actuator's 300 extend cavity will become sub-atmospheric and this can cause the hydraulic fluid to boil and cause damage to the actuator 300. In contrast, the closed velocity fuse 224 limits the actuator velocity (i.e., thrust reverser 400 deploy speed) and thereby ensures that the fluid flow from the supply like 214b is reduced to a level below a cavitation threshold when the thrust reverser element 400 experiences expected assisting loads 605.

Figure 8:
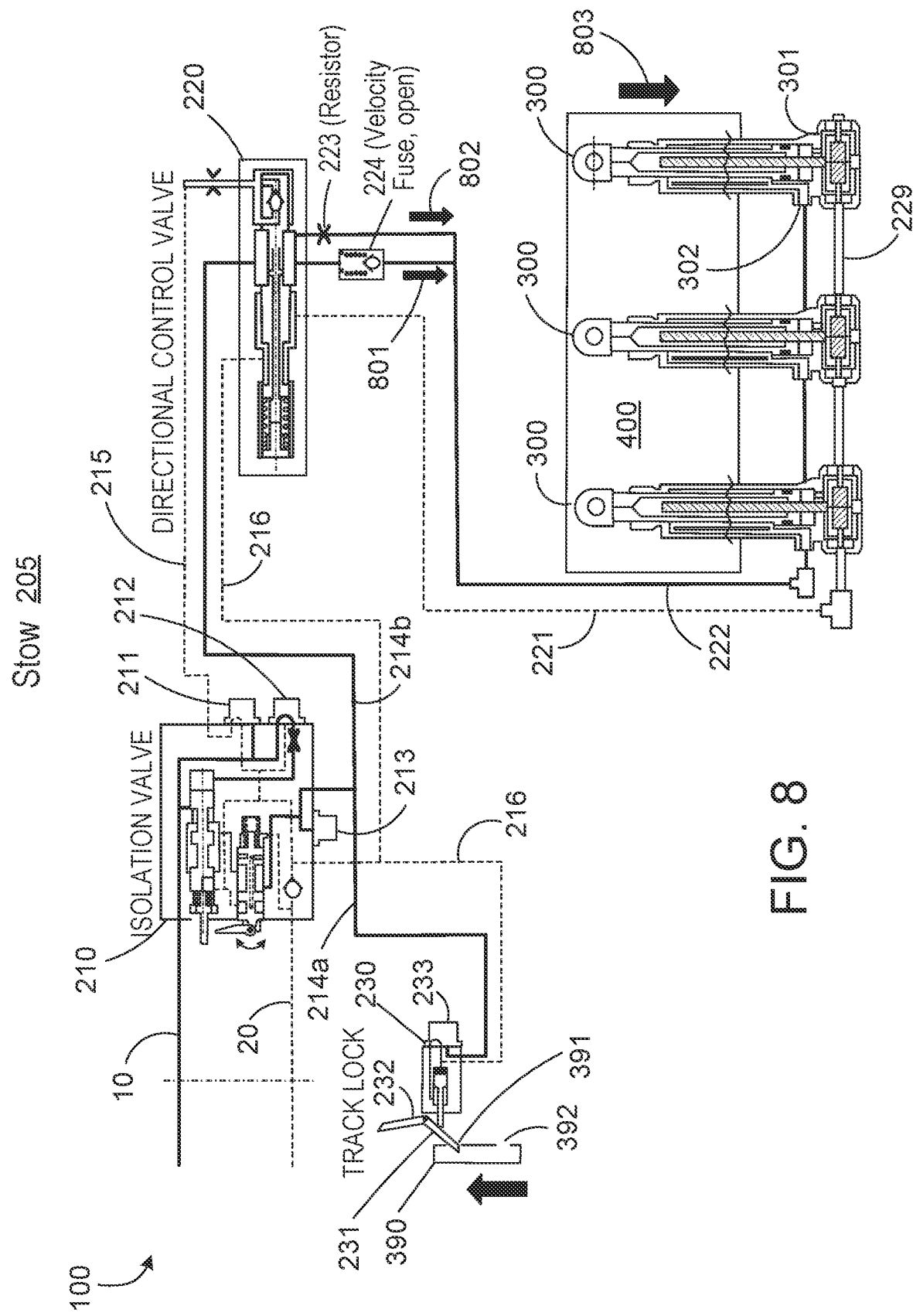
FIG. 8 is a schematic diagram that shows the example two-speed TRAS system of FIG. 3 in a stow state.

FIG. 8 is a schematic diagram that shows the two-speed TRAS system of FIG. 3 in a stow state 205. One of the two solenoid valves 211, 212 of the deploy supply line 215 of the isolation valve 210 is de-energized. With the velocity fuse 224 open, hydraulic fluid flow from the stow supply line 214b is ported to the stow ports 302 chambers of the actuators 300 through the resistor 223 and velocity fuse 224, indicated by arrows 801 and 802 respectively, in order to retract (stow) the thrust reverser element, indicated by arrow 803. Hydraulic fluid flows out of the deploy ports 301 and is returned to the hydraulic fluid return 20 by the hydraulic fluid return line 216.

In the stow state 205, the track lock 230 includes a spring biased to a locked position and the pawl 231, 232 reengages the slider 390 to secure the thrust reverser element 400 in the stowed position when the thrust reverser element 400 reaches the end of the stow movement.

Additionally, in some instances, the principal of operation of the velocity fuse 224 described above is used to provide two TRAS retract speeds. Some TRASes 100 are normally extended during flight and the actuators 300 retract to deploy the thrust reverser element 400. For example, bucket-type TRASes 100, such those used on the B737-200.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of operating a thrust reverser element, the method comprising:
   flowing hydraulic fluid to a deploy port of a hydraulic actuator to move the thrust reverser element from a stowed position to a deployed position;
   receiving a flow of hydraulic fluid from a stow port of the hydraulic actuator through a restrictor and a velocity fuse;
   automatically closing the velocity fuse when a flow rate of the flow of hydraulic fluid from the hydraulic actuator through the velocity fuse exceeds a threshold value, the flow of hydraulic fluid from the hydraulic actuator passing through the restrictor alone; and
   automatically opening the velocity fuse when the thrust reverser element reaches the deployed position and the flow of hydraulic fluid from the stow port of the hydraulic actuator is below a minimum value.

2. The method of claim 1, comprising:
   with the thrust reverser element in the deployed position, flowing hydraulic fluid through the restrictor and the velocity fuse to the stow port of the hydraulic actuator to move the thrust reverser element from the deployed position to the stowed position; and
   receiving, at a fluid return, a flow of hydraulic fluid from the deploy port of the hydraulic actuator.

3. The method of claim 1, wherein a two-speed thrust reverser actuation system comprises:
   the thrust reverser element, configured to move between the stowed position and the deployed position during normal use in association with a jet engine, and arranged to experience an assisting load during movement of the thrust reverser element from the stowed position toward the deployed position,
   an isolation valve configured to supply hydraulic fluid under pressure;
   the hydraulic actuator, configured to move the thrust reverser element between the stowed position and the deployed position, the hydraulic actuator comprising:
      the deploy port, through which hydraulic fluid under pressure from the isolation valve is admitted to a first side of the hydraulic actuator during operation of the hydraulic actuator in a thrust reverser element deploy mode to displace the thrust reverser element from the stowed position to the deployed position, and the stow port, through which hydraulic fluid is displaced from a second side of the hydraulic actuator during operation in the deploy mode; and a directional control valve comprising a regeneration feature through which hydraulic fluid displaced from the second side of the hydraulic actuator is returned to the first side of the hydraulic actuator in addition to the hydraulic fluid supplied from the isolation valve during operation in the deploy mode, the regeneration feature comprising:

the restrictor, and the velocity fuse, arranged in parallel with the restrictor and configured to close when the flow rate of hydraulic fluid through the velocity fuse in a first direction exceeds the threshold value.

4. The method of claim 3, wherein the restrictor defines a first orifice and the velocity fuse defines a second orifice, and the first orifice and the second orifice define an overall orifice of the regeneration feature.

5. The method of claim 3, further comprising regenerating hydraulic fluid from a stow line to a supply line during the deploy mode, wherein the directional control valve is configured to supply the hydraulic fluid to the hydraulic actuator via the supply line and receive the hydraulic fluid from the hydraulic actuator via the stow line.

6. The method of claim 3, further comprising supplying, by the isolation valve, the hydraulic fluid to the directional control valve from a source of hydraulic fluid under pressure.

7. The method of claim 3, wherein the threshold value of the velocity fuse corresponds to a maximum deploy rate of the thrust reverser element.

8. The method of claim 3, further comprising opening the velocity fuse based on the flow rate of hydraulic fluid through the regeneration feature dropping below the minimum value.

9. The method of claim 8, wherein the velocity fuse is configured to open when the flow rate of hydraulic fluid through the regeneration feature is zero.

10. The method of claim 9, further comprising:

admitting hydraulic fluid under pressure from the isolation valve through the stow port to the second side of the hydraulic actuator, where a stow side of the hydraulic actuator is a high pressure side during operation of the hydraulic actuator in a thrust reverser element stow mode;

displacing the thrust reverser element from the deployed position toward the stowed position;

displacing hydraulic fluid from the first side of the hydraulic actuator through the deploy port during operation in the deploy mode; and moving, by the hydraulic actuator, the thrust reverser element from the deployed position to the stowed position in the thrust reverser element stow mode.

11. The method of claim 10, further comprising: reversing the hydraulic fluid flow through the regeneration feature; switching, by the reversing, the hydraulic actuator from the thrust reverser element deploy mode to the thrust reverser element stow mode; and flowing the hydraulic fluid through the velocity fuse in a second direction opposite the first direction.

12. The method of claim 11, further comprising opening the velocity fuse based on the hydraulic fluid flowing through the velocity fuse in the second direction.

13. The method of claim 1, further comprising:

opening the velocity fuse during a deploy mode;

flowing hydraulic fluid through both the restrictor and the velocity fuse during the deploy mode;

moving the thrust reverser element at a first speed during the deploy mode;

closing the velocity fuse during the deploy mode;

flowing hydraulic fluid through the restrictor alone during the deploy mode; and moving the thrust reverser element at a second speed during the deploy mode.

14. The method of claim 13, further comprising:

receiving an assisting load at the thrust reverser element;

urging, by the assisting load, the flow rate of hydraulic fluid through the velocity fuse;

exceeding, by the flow rate, the threshold value;

closing, based on the exceeding, the velocity fuse; and switching from the first speed to the second speed based on the closing of the velocity fuse.

15. The method of claim 14, further comprising:

increasing, by the assisting load on the thrust reverser element, a deploy rate of the thrust reverser element; and increasing, by the assisting load on the thrust reverser element, the flow rate of hydraulic fluid through the velocity fuse in a first movement speed mode.

16. The method of claim 14, wherein the assisting load on the thrust reverser element increases during movement of the thrust reverser element from the stowed position towards the deployed position.

17. The method of claim 1, wherein the thrust reverser element comprises:

a translating cowl mounted to a nacelle of a gas turbine engine and adapted to translate a distance in an aft direction of the gas turbine engine, the translating cowl having a radially inner wall that defines a radially outer flow surface of a bypass duct defined by and between the nacelle and a core of the gas turbine engine;

a fixed structure within the nacelle that does not translate with the translating cowl, the fixed structure comprising at least one opening that is exposed to the bypass duct when the translating cowl is translated in the aft direction; and blocker doors mounted to the nacelle and having blocker door stowed positions and blocker door deployed positions, at least a portion of the blocker doors being disposed in the bypass duct in the deployed position; and wherein the blocker doors are arranged to experience an assisting load from an airflow in the bypass duct.

18. The method of claim 17, wherein the hydraulic actuator is configured to deploy the blocker doors in a first direction and stow the blocker doors in an opposite direction.

19. The method of claim 1, wherein the velocity fuse and the restrictor are incorporated together into a single cartridge assembly.

20. The method of claim 1, wherein the hydraulic actuator comprises the velocity fuse and the restrictor.

* * * * *